US012573189B2

(12) United States Patent
Horii

(10) Patent No.: US 12,573,189 B2
(45) Date of Patent: Mar. 10, 2026

(54) PROCESSING METHOD AND PROCESSING DEVICE USING SAME

(71) Applicant: Panasonic Intellectual Property Management Co., Ltd., Osaka (JP)

(72) Inventor: Toshihide Horii, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 525 days.

(21) Appl. No.: 18/030,900

(22) PCT Filed: Jun. 25, 2021

(86) PCT No.: PCT/JP2021/024224
§ 371 (c)(1),
(2) Date: Sep. 29, 2023

(87) PCT Pub. No.: WO2022/074877
PCT Pub. Date: Apr. 14, 2022

(65) Prior Publication Data
US 2024/0119717 A1    Apr. 11, 2024

(30) Foreign Application Priority Data
Oct. 8, 2020    (JP) ................................. 2020-170751

(51) Int. Cl.
*G06V 10/00*        (2022.01)
*G06V 10/77*        (2022.01)
(Continued)

(52) U.S. Cl.
CPC .......... *G06V 10/82* (2022.01); *G06V 10/7715* (2022.01); *G06V 10/774* (2022.01); *G06V 10/806* (2022.01)

(58) Field of Classification Search
CPC .. G06N 3/02; G06N 3/04; G06N 3/08; G06N 3/09; G06N 3/042; G06N 3/045;
(Continued)

(56) References Cited

U.S. PATENT DOCUMENTS 10,115,040 B2 * 10/2018 Brauer ................... G01N 21/88
10,380,479 B2 * 8/2019 Chang ..................... G06N 3/04
(Continued)

FOREIGN PATENT DOCUMENTS

WO        2019159419 A1    8/2019
WO        2019194044 A1    10/2019
(Continued)

OTHER PUBLICATIONS

Extended European Search Report for corresponding Application No. 21877181.4 dated Mar. 5, 2024.
(Continued)

*Primary Examiner* — Amir Alavi
(74) *Attorney, Agent, or Firm* — Renner, Otto, Boisselle & Sklar, LLP

(57) ABSTRACT

A first processor executes processing of a first neural network on a target image to be processed and generates a first feature map having a size (1/m)×(1/n) times as large as the target image. An enlarger enlarges the first feature map generated in the first processor by n times. A second processor executes processing of a second neural network on the target image and generates a second feature map having a size (1/m) times as large as the target image. The combiner combines the first feature map enlarged by n times in the enlarger and the second feature map generated in the second processor.

7 Claims, 7 Drawing Sheets

(51) Int. Cl.
| | |
|---|---|
| *G06V 10/774* | (2022.01) |
| *G06V 10/80* | (2022.01) |
| *G06V 10/82* | (2022.01) |

(58) Field of Classification Search
CPC ........ G06N 3/047; G06N 3/082; G06N 3/088; G06N 3/092; G06N 3/0454; G06N 3/0475; G06N 3/0464; G06N 20/00; G06N 20/10; G06N 20/20; G06V 10/82; G06V 10/761; G06V 10/762; G06V 10/764; G06V 10/765; G06V 10/7715; G06V 10/85; G06V 10/806; G06V 10/771; G06V 10/774
See application file for complete search history.

(56) References Cited

U.S. PATENT DOCUMENTS

| | | | | |
|---|---|---|---|---|
| 10,402,688 | B2 * | 9/2019 | Brauer | G06T 7/001 |
| 10,650,508 | B2 * | 5/2020 | Chang | G06F 18/24143 |
| 10,776,671 | B2 * | 9/2020 | Lin | G06N 3/084 |
| 10,796,184 | B2 * | 10/2020 | Senay | G06V 10/764 |
| 11,074,492 | B2 * | 7/2021 | Lele | G06N 3/063 |
| 11,302,035 | B2 * | 4/2022 | Asama | G06T 5/70 |
| 11,315,235 | B2 | 4/2022 | Horit | |
| 11,436,717 | B2 | 9/2022 | Horii et al. | |
| 11,636,570 | B2 * | 4/2023 | Zheng | G06V 10/46 345/428 |
| 11,854,159 | B2 * | 12/2023 | Kim | G06V 10/764 |
| 12,367,547 | B2 * | 7/2025 | Cai | G06N 3/048 |
| 2020/0104695 | A1 | 4/2020 | Laaksonen et al. | |
| 2020/0134772 | A1 | 4/2020 | Poudel Karmatha et al. | |
| 2020/0380665 | A1 | 12/2020 | Horii | |
| 2020/0410657 | A1 | 12/2020 | Horii et al. | |
| 2021/0357651 | A1 * | 11/2021 | Fan | G06N 3/0464 |
| 2021/0390696 | A1 | 12/2021 | Iwase et al. | |

FOREIGN PATENT DOCUMENTS

| | | | |
|---|---|---|---|
| WO | 2020064715 | A1 | 4/2020 |
| WO | 2020183799 | A1 | 9/2020 |

OTHER PUBLICATIONS

International Search Report for corresponding Application No. PCT/JP2021/024224, mailed Sep. 21, 2021.

* cited by examiner

10

500

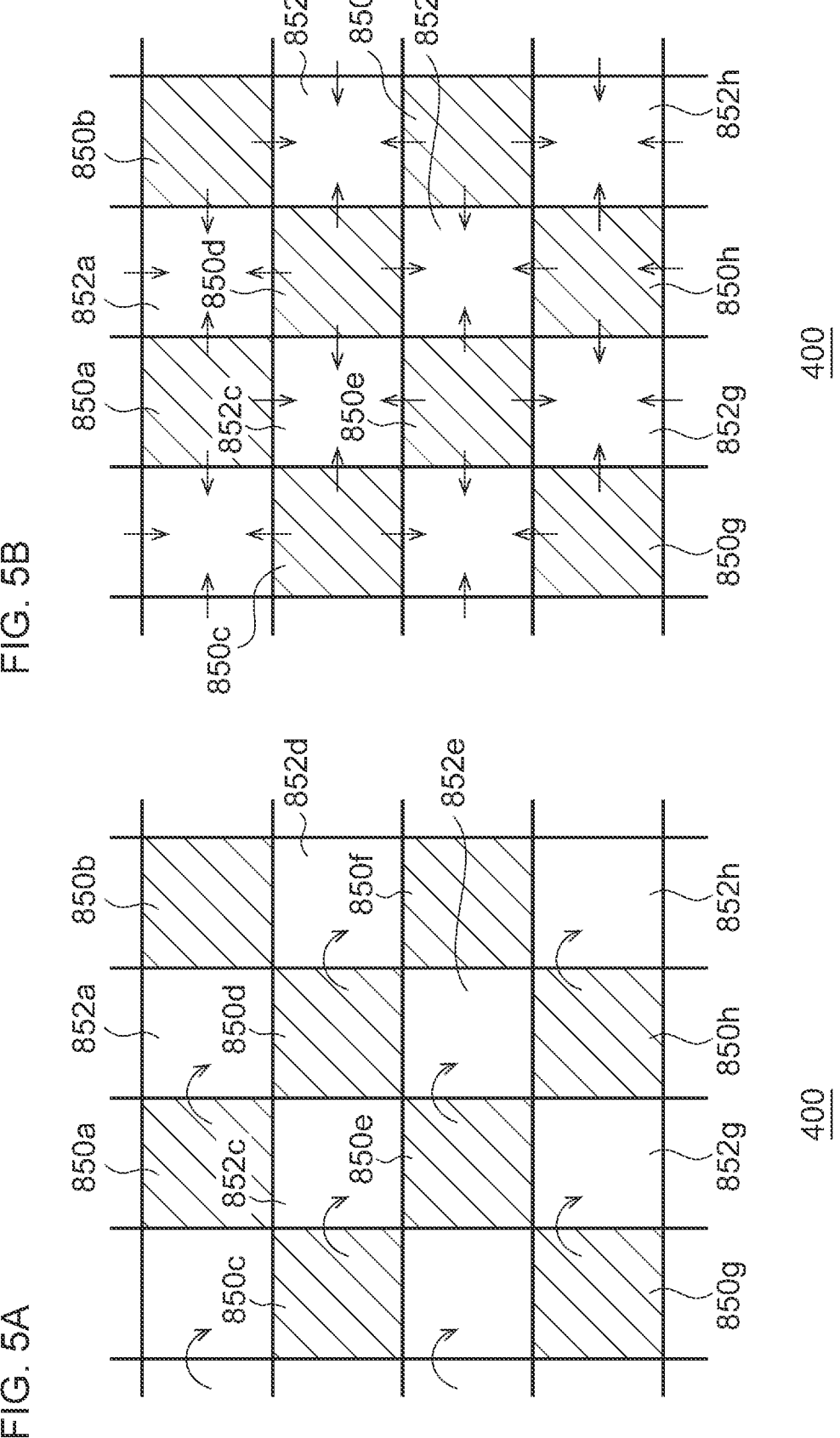

PROCESSING METHOD AND PROCESSING DEVICE USING SAME

TECHNICAL FIELD

The present disclosure relates to processing technology, particularly, a processing method for executing processing on input information and a processing device using the same.

BACKGROUND ART

For example, Deep Learning is used for image recognition processing. Deep Learning is known as a method of machine learning using a multilayer neural network. For example, a convolutional neural network is used for the multilayer neural network. The convolutional neural network is formed by a multilayer neural network that repeats convolution and pooling of a local region. Furthermore, a structure of a fully convolutional neural network in which a fully connected layer constituting the convolutional neural network is a convolution layer has been proposed (see, for example, Patent Literature 1).

CITATION LIST

Patent Literature

[Patent Literature 1] WO 19/159419 A

SUMMARY OF INVENTION

Technical Problem

Since the fully convolutional neural network is a stack of processing of local regions, a positional relation of elements in an image to be processed is not specified. In order to improve the accuracy of image recognition in the neural network, it is preferable that the positional relation of the elements in the image can be specified.

The present disclosure has been made in view of such a situation, and an object thereof is to provide technology for improving the accuracy of image recognition in a neural network that does not include a fully connected layer.

Solution to Problem

In order to solve the above problem, a processing device according to one aspect of the present disclosure includes: a first processor that executes processing of a first neural network on a target image to be processed and generates a first feature map having a size $(1/m) \times (1/n)$ times as large as the target image; an enlarger that enlarges the first feature map generated in the first processor by n times; a second processor that executes processing of a second neural network on the target image and generates a second feature map having a size $(1/m)$ times as large as the target image; and a combiner that combines the first feature map enlarged by n times in the enlarger and the second feature map generated in the second processor. The first neural network of the first processor and the second neural network of the second processor do not include a fully connected layer. At the time of learning, a first learning image is input to the first neural network of the first processor. At the time of learning, a second learning image that is a part of the first learning image and has a size $(1/n)$ times as large as the first learning image is input to the second neural network of the second processor. At the time of learning, the combiner is connected to the first processor without passing through the enlarger and is connected to the second processor.

Another aspect of the present disclosure is a processing method. This method includes: a step of executing processing of a first neural network on a target image to be processed and generating a first feature map having a size $(1/m) \times (1/n)$ times as large as the target image; a step of enlarging the generated first feature map by n times; a step of executing processing of a second neural network on the target image and generating a second feature map having a size $(1/m)$ times as large as the target image; and a step of combining the first feature map enlarged by n times and the generated second feature map. The first neural network and the second neural network do not include a fully connected layer. At the time of learning, a first learning image is input to the first neural network. At the time of learning, a second learning image that is a part of the first learning image and has a size $(1/n)$ times as large as the first learning image is input to the second neural network. At the time of learning, the combination is performed without the enlargement by n times.

Note that arbitrary combinations of the above components and modifications of the expressions of the present disclosure between methods, devices, systems, computer programs, recording media recording the computer programs, and the like are also effective as aspects of the present disclosure.

Advantageous Effects of Invention

According to the present disclosure, the accuracy of image recognition in a neural network that does not include a fully connected layer can be improved.

BRIEF DESCRIPTION OF DRAWINGS

FIGS. 5A and 5B are diagrams illustrating an outline of processing in an enlarger of FIG. 3B.

DESCRIPTION OF EMBODIMENTS

Before specifically describing embodiments of the present disclosure, an outline of the embodiments will be described. The embodiment relates to a processing device that executes image recognition processing on an image to be processed (hereinafter, referred to as a "target image") and specifies elements in the target image. For the image recognition processing, the use of a fully convolutional neural network that does not include a fully connected layer is possible. In the fully convolutional neural network, processing of a convolution layer and a pooling layer is repeated, and an image in which segmentation by color painting is performed on an included object (hereinafter, referred to as a "segmentation image" or a "feature map") is output.

However, as described above, since the fully convolutional neural network is a stack of processing of local regions, a positional relation of the elements in the target image is not specified. Since the accuracy of image recognition is improved by using the positional relation of the elements in the target image, it is desirable to specify the positional relation of the elements in the target image. On the other hand, in order to specify the positional relation of the elements in the target image, it is necessary to widen a region to be recognized by the fully convolutional neural network. However, by widening the region, the accuracy of the image recognition in the region is deteriorated. For this reason, it is required to achieve both specifying the positional relation of the elements in the target image and improving the accuracy of the image recognition in the region.

The processing device according to the present embodiment includes a network (hereinafter, referred to as a "first network") that recognizes a wide area and a network (hereinafter, referred to as a "second network") that recognizes a narrow area, and inputs a processed image to the first network and the second network. In addition, the processing device generates a final feature map by combining a feature map (hereinafter, referred to as a "first feature map") generated by the first network and a feature map (hereinafter, referred to as a "second feature map") generated by the second network.

Figures 1A, 1B:
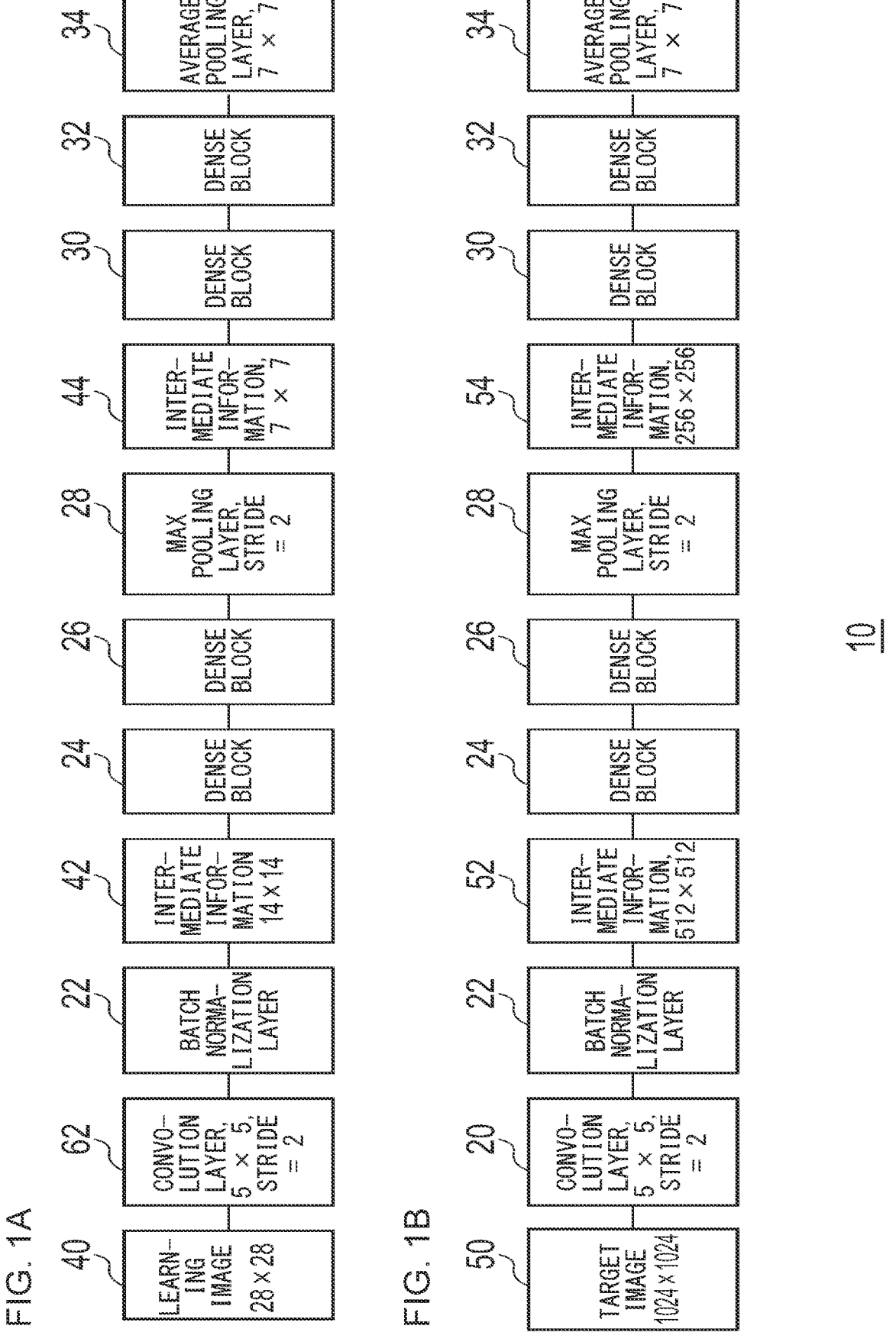
FIGS. 1A and 1B are diagrams illustrating a configuration of a processing device to be compared with the present embodiment.

FIGS. 1A and 1B illustrate a configuration of a processing device 10 to be compared. In particular, FIG. 1A illustrates a configuration for learning processing, and FIG. 1B illustrates a configuration for recognition processing. The processing device 10 in FIG. 1A and the processing device 10 in FIG. 1B may be the same device or different devices.

As illustrated in FIG. 1A, the processing device 10 includes a convolution layer 20, a batch normalization layer 22, a dense block 24, a dense block 26, a max pooling layer 28, a dense block 30, a dense block 32, and an average pooling layer 34 as the configuration for the learning processing. In the learning processing, a learning image 40 is used. The learning image 40 is an image in which a result of image recognition is prepared in advance as teacher data. The learning image 40 has, for example, a size of "28×28". This can be said to be, for example, a partial image, that is, a detailed image, of an image having a size of "1024×1024". The learning image 40 is input to the convolution layer 20.

The convolution layer 20 executes spatial filtering while shifting a spatial filter having a size smaller than the size of an input image, for example, the learning image 40. In the convolution layer 20, the size of the spatial filter is defined as "5×5", and a stride that is a width to shift the spatial filter is defined as "2". Since the spatial filtering is known technology, the description thereof is omitted here. The spatial filtering corresponds to convolution processing, and a feature amount of an image is extracted by the convolution processing. Padding or the like may be executed in the convolution layer 20. Further, the convolution layer 20 may perform a plurality of spatial filtering on the image in parallel using a plurality of spatial filters in parallel. By the parallel use of such a plurality of spatial filters, the image increases. The number of spatial filters used in parallel in the convolution layer 20 is called the number of channels. Known technology may be used for the batch normalization layer 22. Intermediate information 42 is a result of processing performed by the convolution layer 20 and the batch normalization layer 22, and indicates information in the middle of processing. The intermediate information 42 has a size of "14×14".

Figure 2:
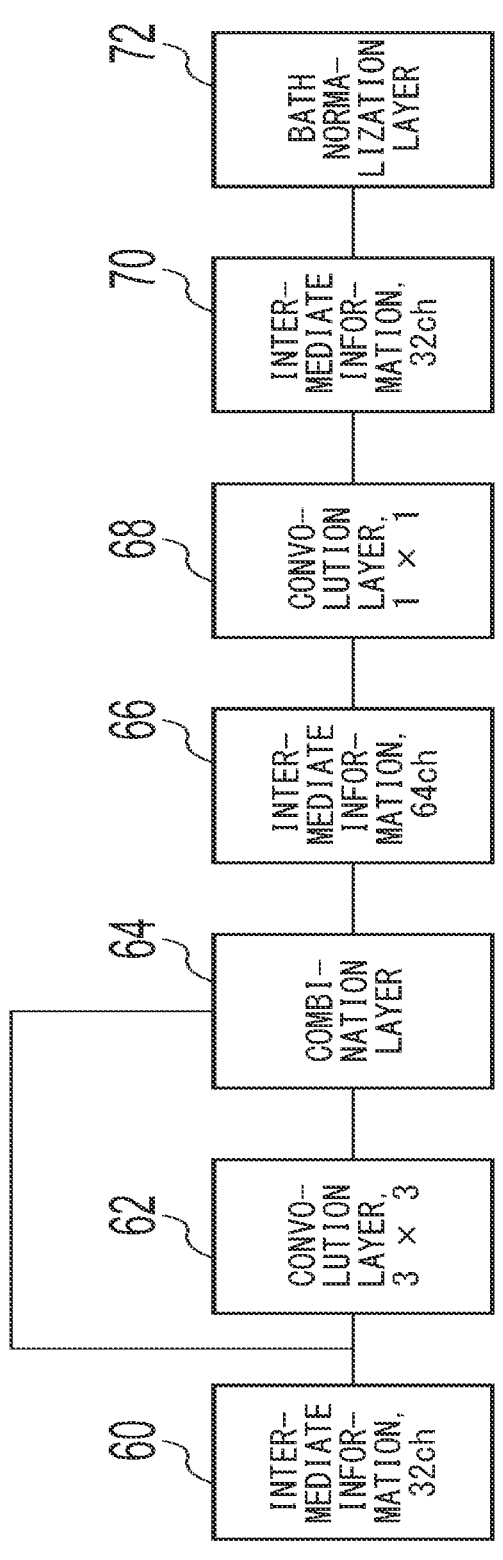
FIG. 2 is a diagram illustrating a configuration of a dense block in FIGS. 1A and 1B.

The dense block 24 is illustrated in FIG. 2. FIG. 2 illustrates a configuration of the dense block. As illustrated in the drawing, intermediate information 60, a convolution layer 62, a combination layer 64, intermediate information 66, a convolution layer 68, intermediate information 70, and a batch normalization layer 72 are included. Similarly to the intermediate information 42, the intermediate information 60, the intermediate information 66, and the intermediate information 70 indicate information in the middle of processing. For example, the intermediate information 60 has 32 channels, the intermediate information 66 has 64 channels, and the intermediate information 70 has 32 channels. The convolution layer 62 and the convolution layer 68 are similar to the convolution layer 20. A size of a spatial filter of the convolution layer 62 is defined as "3×3", and a size of a spatial filter of the convolution layer 68 is defined as "1×1". The combination layer 64 combines the intermediate information 60 and a processing result of the convolution layer 62 to generate the intermediate information 66. The intermediate information 60 and a processing result of the convolution layer 62 are combined as different channels. The batch normalization layer 72 is similar to the batch normalization layer 22. The description returns to FIG. 1A.

The dense block 26, the dense block 30, and the dense block 32 are configured similarly to the dense block 24. The dense block 24, the dense block 26, the dense block 30, and the dense block 32 are not limited to the configuration of FIG. 2, and may have different combinations of convolution layers and the like. In addition, the configurations of the dense block 24, the dense block 26, the dense block 30, and the dense block 32 may be different from each other.

The max pooling layer 28 is configured similarly to the convolution layer 20. The max pooling layer 28 reduces the size of the image by combining a plurality of pixels included in an arbitrary region in the image into one pixel. The max pooling layer 28 uses an average value of a plurality of pixel values in the region for one pixel to combine the plurality of pixels into one pixel. The pooling processing is performed to enhance robustness against translational movement of an average value in a region of interest. A stride that is a width to shift the region in the max pooling layer 28 is defined as "2".

The average pooling layer 34 performs pooling processing, similarly to the max pooling layer 28. The average pooling layer 34 uses a maximum value of a plurality of pixel values in a region for one pixel to combine a plurality of pixels into one pixel. The pooling processing is performed to enhance robustness against translational movement of a representative value in a region of interest. A size of the region in the average pooling layer 34 is defined as "7×7".

In the learning processing, coefficients of spatial filters of the convolution layer 20 and the convolution layers included in the dense block 24, the dense block 26, the dense block 30, and the dense block 32 are learned on the basis of the learning image 40 and the teacher data. Since known technology may be used for learning of the coefficients of the spatial filters under a situation where the learning image 40 and the teacher data are used, the description thereof will be omitted here.

As illustrated in FIG. 1B, the processing device 10 includes a convolution layer 20 to an average pooling layer 34 as a configuration for the recognition processing. This configuration is the same as that of FIG. 1A. Here, the coefficients of the spatial filters derived by the learning processing in FIG. 1A are set to the convolution layer 20 and the convolution layers included in the dense block 24, the dense block 26, the dense block 30, and the dense block 32.

A target image 50 is an image to be subjected to recognition processing in the processing device 10, and has a size of "1024×1024", for example. The target image 50 is input to the convolution layer 20.

Since the convolution layer 20 to the average pooling layer 34 perform processing similar to the previous processing, the description thereof is omitted here. In authentication processing, intermediate information 52 and intermediate information 54 are generated. The intermediate information 52 has a size of "512×512", and the intermediate information 54 has a size of "256×256". A result of the authentication processing is output from the average pooling layer 34.

Since the learning image 40 has a size of "28×28" and the target image 50 has a size of "1024×1024", it can be said that the learning processing using the learning image 40 is performed for a narrow area. Therefore, the processing device 10 can recognize elements in the narrow area in detail. Here, when different elements are similar in the narrow area, it is difficult for the processing device 10 to distinguish these elements. On the other hand, when the elements are disposed at different positions in the entire image, the elements can be distinguished on the basis of a relative positional relation in which the elements are disposed. For this purpose, the learning processing needs to be performed on a wide area. However, in a case where the learning processing is performed on the wide area, the processing device 10 cannot recognize the elements in the narrow area in detail. Therefore, it is required to achieve both detailed recognition of the elements in the narrow area and recognition of the positions of the elements in the wide area.

Figure 3A:
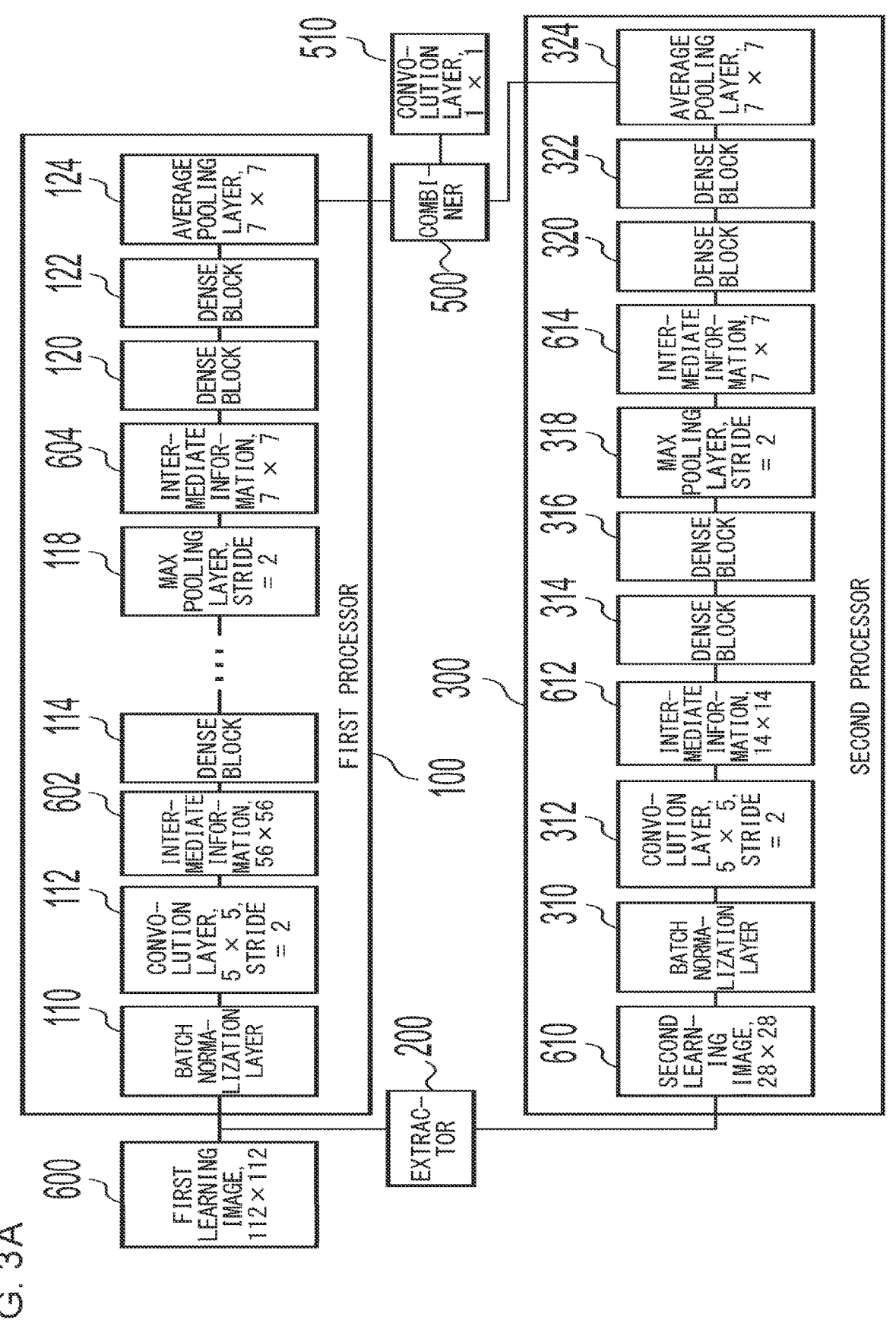
FIGS. 3A and 3B are diagrams illustrating a configuration of a processing device according to the present embodiment.
Figure 3B:
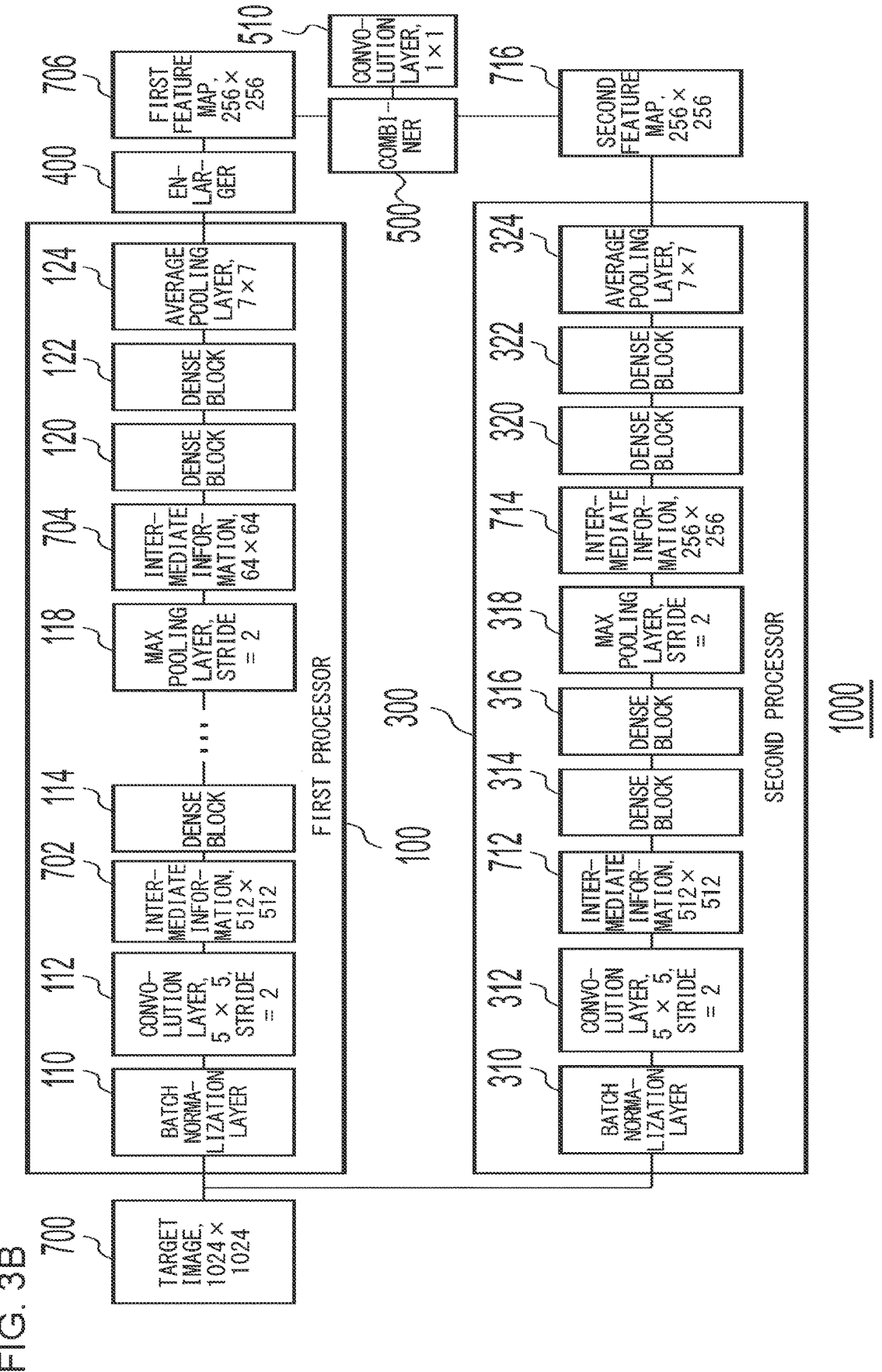

FIGS. 3A and 3B illustrate a configuration of a processing device 1000. In particular, FIG. 3A illustrates a configuration for learning processing, and FIG. 3B illustrates a configuration for recognition processing. The processing device 1000 in FIG. 3A and the processing device 1000 in FIG. 3B may be the same device or different devices. The processing device 1000 illustrated in FIGS. 3A and 3B includes a first processor 100, a second processor 300, a combiner 500, and a convolution layer 510 in common. On the other hand, only the processing device 1000 illustrated in FIG. 3A includes an extractor 200, and only the processing device 1000 illustrated in FIG. 3B includes an enlarger 400.

The first processor 100 includes a batch normalization layer 110, a convolution layer 112, a dense block 114, a max pooling layer 118, a dense block 120, a dense block 122, and an average pooling layer 124. The second processor 300 includes a batch normalization layer 310, a convolution layer 312, a dense block 314, a dense block 316, a max pooling layer 318, a dense block 320, a dense block 322, and an average pooling layer 324. The first processor 100 and the second processor 300 do not include a fully connected layer. Here, (1) learning processing and (2) recognition processing will be described in this order.

(1) Learning Processing

In the learning processing illustrated in FIG. 3A, a first learning image 600 is used. The first learning image 600 is an image in which a result of image recognition is prepared in advance as teacher data. The first learning image 600 has, for example, a size of "112×112". The first learning image 600 is input to the first processor 100 and the extractor 200.

The batch normalization layer 110, the convolution layer 112, the dense block 114, the max pooling layer 118, the dense block 120, the dense block 122, and the average pooling layer 124 in the first processor 100 are included in a first neural network. In FIG. 3A, a configuration between the dense block 114 and the max pooling layer 118 is omitted. These execute processing similar to those in FIGS. 1A and 1B and 2. A size of a spatial filter of the convolution layer 112 is defined as "5×5", and a stride is defined as "2". A stride of the max pooling layer 118 is defined as "2", and a size of a region in the average pooling layer 124 is defined as "7×7".

In the first processor 100, intermediate information 602 and intermediate information 604 are generated. The intermediate information 602 has a size of "56×56", and the intermediate information 604 has a size of "7×7". Intermediate information generated in the average pooling layer 124 also has a size of "7×7". Therefore, the first processor 100 converts the size of "112×112" into the size of "7×7", which can be said to be conversion of $(1/m) \times (1/n)$ times. Here, m=4 and n=4 are satisfied.

The extractor 200 generates a second learning image 610 by extracting a part of the first learning image 600, for example, a center portion. Since the second learning image 610 has a size of "28×28", it has a size $(1/n)$ times as large as the first learning image 600. The second learning image 610 is input to the second processor 300.

The batch normalization layer 310, the convolution layer 312, the dense block 314, the dense block 316, the max pooling layer 318, the dense block 320, the dense block 322, and the average pooling layer 324 in the second processor 300 are included in a second neural network. These execute processing similar to those in FIGS. 1A and 1B and 2. A size of a spatial filter of the convolution layer 312 is defined as "5×5", and a stride is defined as "2". A stride of the max pooling layer 318 is defined as "2", and a size of a region in the average pooling layer 324 is defined as "7×7".

In the second processor 300, intermediate information 612 and intermediate information 614 are generated. The intermediate information 612 has a size of "14×14", and the intermediate information 614 has a size of "7×7". Intermediate information generated in the average pooling layer 324 also has a size of "7×7". Therefore, the second processor 300 converts the size of "28×28" into the size of "7×7", which can be said to be conversion of $(1/m)$ times.

For learning, the first processor 100 uses the first learning image 600, and the second processor 300 uses the second learning image 610. Since the size of the first learning image 600 is larger than the size of the second learning image 610, the first network of the first processor 100 recognizes a wide area, and the second network of the second processor 300 recognizes a narrow area.

Since the conversion of $(1/m) \times (1/n)$ times is performed in the first processor 100 and the conversion of $(1/m)$ times is performed in the second processor 300, conversion magnifications are different in the first processor 100 and the second processor 300. However, since the size of the second learning image 610 is $(1/n)$ times the size of the first learning image 600, the intermediate information output from the first processor 100 and the intermediate information output from the second processor 300 have the same size.

Figures 4A, 4B, 4C:
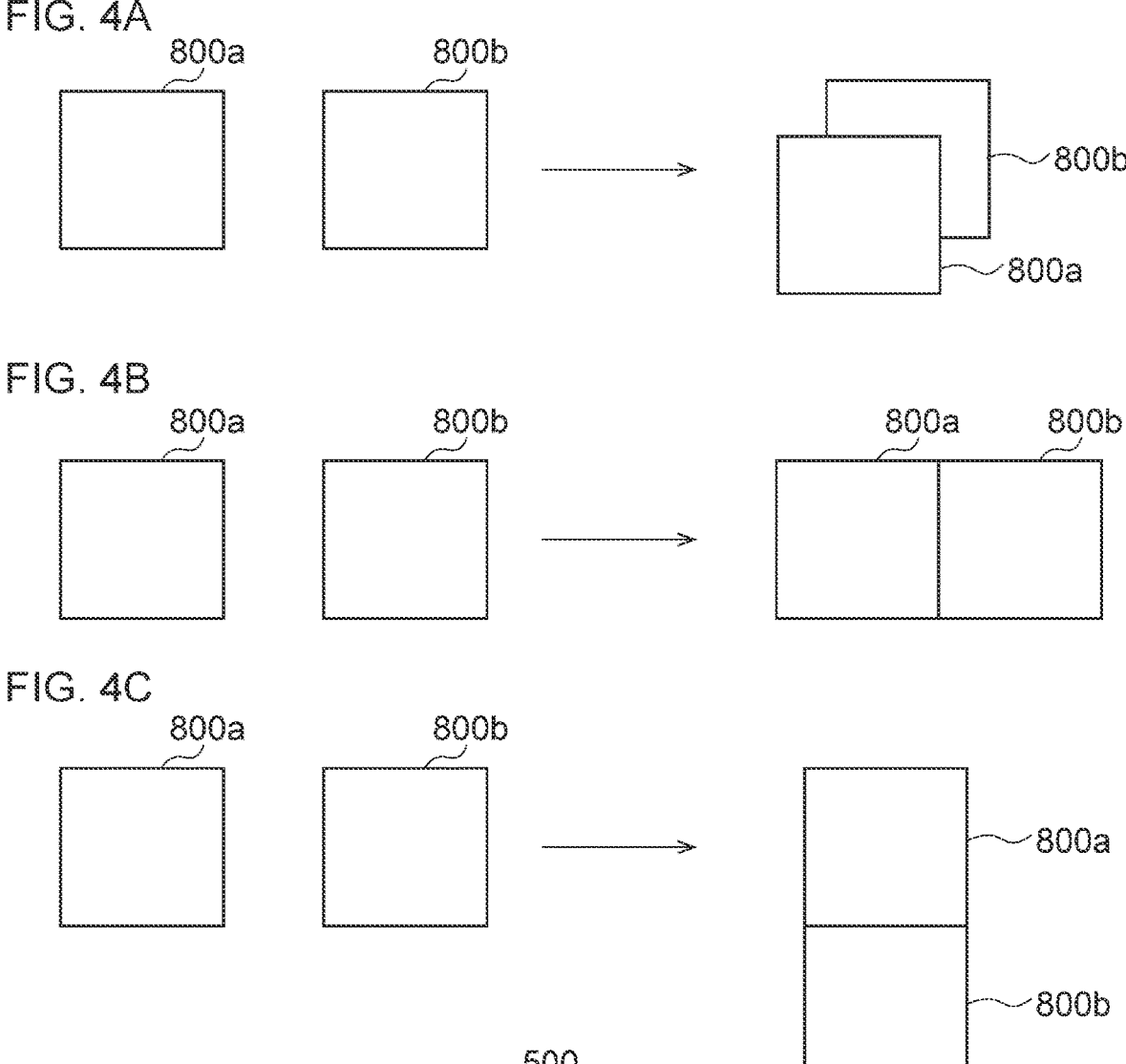
FIGS. 4A-4C are diagrams illustrating an outline of processing in a combiner of FIGS. 3A and 3B.

The combiner 500 combines the intermediate information from the average pooling layer 124 and the intermediate information from the average pooling layer 324. FIGS. 4A to 4C illustrate an outline of processing in the combiner 500. First input information 800a and second input information 800b are two pieces of information input to the combiner 500, and include intermediate information. In FIG. 4A, the first input information 800a and the second input information 800b are combined as different channels. In FIG. 4B, the first input information 800*a* and the second input information 800*b* are arranged in a lateral direction and become information of one channel. In FIG. 4C, the first input information 800*a* and the second input information 800*b* are arranged in a longitudinal direction and become information of one channel. The description returns to FIG. 3A. The combiner 500 may combine two inputs by performing four arithmetic operations such as addition and subtraction for each pixel. The convolution layer 510 is formed similarly to the above. The size of the spatial filter of the convolution layer 510 is defined as "1×1".

In the learning processing, the coefficient of the spatial filter of the convolution layer is learned on the basis of the first learning image 600 and the teacher data. At that time, the second processor 300 uses the second learning image 610. Since known technology may be used for learning the coefficient of the spatial filter, the description thereof is omitted here.

(2) Recognition Processing

The coefficients of the spatial filters derived by the learning processing in FIG. 3A are set to respective convolution layers in FIG. 3B. In authentication processing illustrated in FIG. 3B, a target image 700 is used. The target image 700 is an image to be subjected to recognition processing in the processing device 1000, and has a size of "1024×1024", for example. The target image 700 is input to the first processor 100 and the second processor 300. The extractor 200 is not used in the authentication processing.

Since the batch normalization layer 110 to the average pooling layer 124 and the batch normalization layer 310 to the average pooling layer 324 execute processing similar to the above processing, the description thereof is omitted here. In the authentication processing, intermediate information 702, intermediate information 704, intermediate information 712, and intermediate information 714 are generated. The intermediate information 702 and the intermediate information 712 have a size of "512×512", the intermediate information 704 has a size of "64×64", and the intermediate information 714 has a size of "256×256".

The first processor 100 generates a first feature map by executing processing of the first neural network on the target image 700. Since the first processor 100 performs conversion of (1/m)×(1/n) times on the target image 700, the first feature map has a size ($\frac{1}{16}$)×($\frac{1}{16}$) times as large as the target image 700. Since the target image 700 has a size of "1024× 1024", the first feature map has a size of "64×64".

On the other hand, the second processor 300 generates a second feature map 716 by executing processing of the second neural network on the target image 700. Since the second processor 300 performs conversion of (1/m) times on the target image 700, the second feature map 716 has a size ($\frac{1}{16}$) times as large as the target image 700. Since the target image 700 has a size of "1024×1024", the second feature map 716 has a size of "256×256".

Since the first feature map generated in the first processor 100 and the second feature map 716 generated in the second processor 300 have different sizes, the first feature map and the second feature map 716 cannot be combined. Therefore, the enlarger 400 is connected to the first processor 100, and the enlarger 400 is connected to the combiner 500. The enlarger 400 generates a first feature map 706 by enlarging the first feature map generated in the first processor 100 by n times. Here, since n=4 is satisfied, the first feature map 706 has the same size of "256×256" as the second feature map 716.

FIGS. 5A and 5B illustrate an outline of processing in the enlarger 400. FIG. 5A illustrates an example of processing in the enlarger 400. A first pixel 850*a* to an eighth pixel 850*h* collectively referred to as pixels 850 are pixels constituting the first feature map generated in the first processor 100. Additional pixels 852 are added between the adjacent pixels 850. For example, a third additional pixel 852*c* is added between the first pixel 850*a*, the third pixel 850*c*, the fourth pixel 850*d*, and the fifth pixel 850*e*. The same applies to a first additional pixel 852*a*, a fourth additional pixel 852*d*, a fifth additional pixel 852*e*, a seventh additional pixel 852*g*, and an eighth additional pixel 852*h*. By adding the additional pixels 852 to the pixels 850 as described above, the first feature map is enlarged by n times. The enlarger 400 duplicates a value of the pixel 850 to the adjacent additional pixel 852. For example, a value of the third pixel 850*c* is duplicated to the third additional pixel 852*c*.

FIG. 5B illustrates another example of processing in the enlarger 400. The pixels 850 and the additional pixels 852 are the same as those in FIG. 5A. The enlarger 400 uses values obtained by interpolating the values of the plurality of pixels 850 surrounding the additional pixel 852 for the additional pixel 852. For example, values in which the value of the first pixel 850*a*, the value of the third pixel 850*c*, the value of the fourth pixel 850*d*, and the value of the fifth pixel 850*e* are stored are used for the third additional pixel 852*c*. Since known technology may be used for the interpolation, the description thereof will be omitted here. The description returns to FIG. 3B.

The combiner 500 combines the first feature map 706 enlarged by n times in the enlarger 400 and the second feature map 716 generated in the second processor 300. In the combiner 500 and the convolution layer 510, processing similar to the above processing is performed.

As described above, the conversion magnification in the first processor 100 is different from the conversion magnification in the second processor 300. On the other hand, in order to combine the output from the first processor 100 and the output from the second processor 300 in the combiner 500, the sizes of both the outputs need to be the same. In order to satisfy these conditions, the sizes of the first learning image 600 and the second learning image 610 are changed by the extractor 200 in the learning processing, and the sizes of the first feature map 706 and the second feature map 716 are matched by the enlarger 400 in the authentication processing.

A subject of a device, a system, or a method in the present disclosure includes a computer. The computer executes a program, thereby implementing functions of the subject of the device, the system, or the method in the present disclosure. The computer includes a processor operating according to the program as a main hardware configuration. The type of the processor is not limited as long as the processor can realize the functions by executing the program. The processor includes one or more electronic circuits including a semiconductor integrated circuit (IC) or a large scale integration (LSI). The plurality of electronic circuits may be integrated on one chip or may be provided on a plurality of chips. The plurality of chips may be integrated into one device or may be provided in a plurality of devices. The program is recorded in a computer-readable non-transitory recording medium such as a ROM, an optical disk, or a hard disk drive. The program may be stored in advance in a recording medium, or may be supplied to the recording medium via a wide-area communication network including the Internet or the like.

Figure 6:
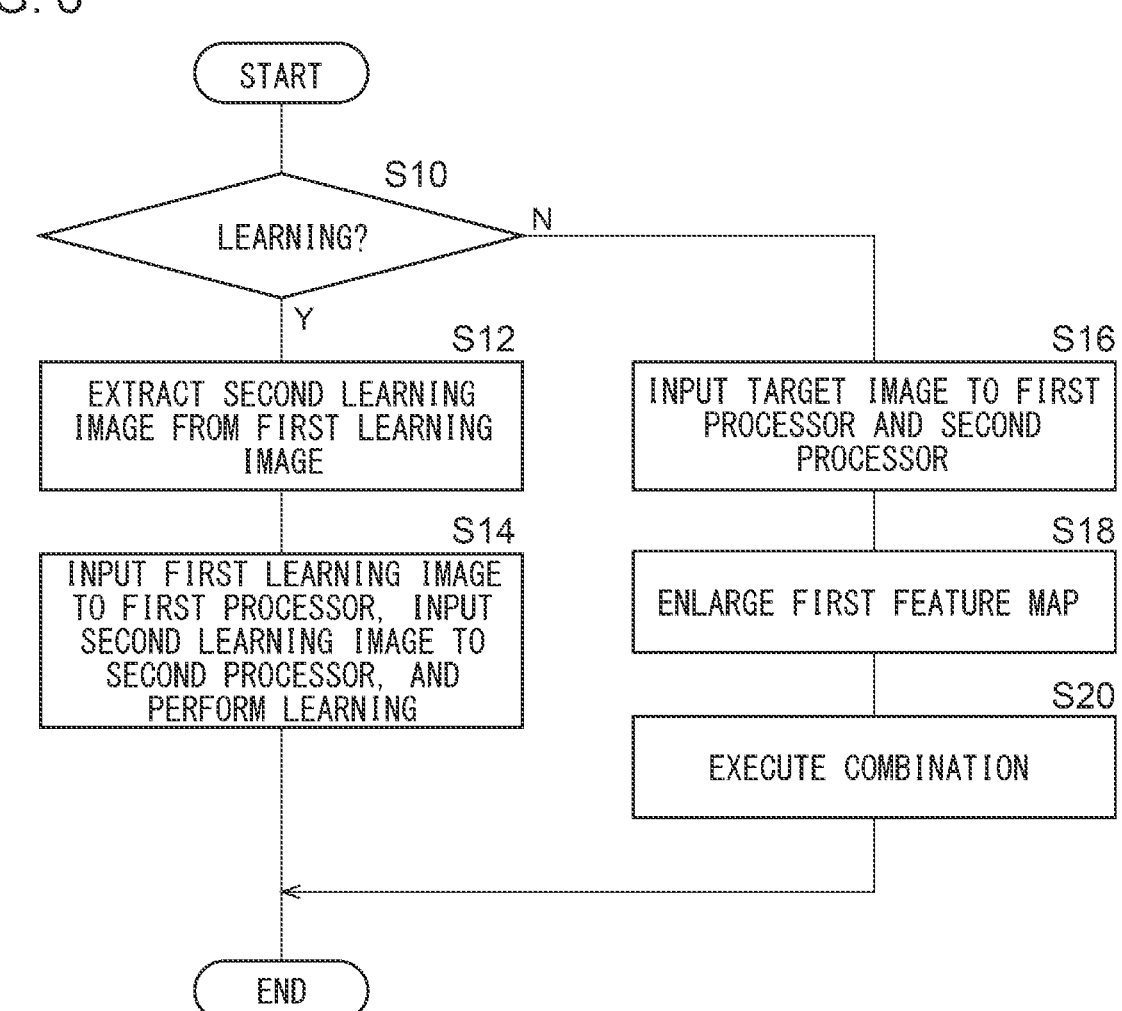
FIG. 6 is a sequence diagram illustrating a processing procedure by the processing device of FIGS. 3A and 3B.

The operation of the processing device 1000 having the above configuration will be described. FIG. 6 is a sequence diagram illustrating a processing procedure by the processing device 1000. When the processing is the learning processing (Y in S10), the extractor 200 extracts the second learning image 610 from the first learning image 600 (S12). The processing device 1000 inputs the first learning image 600 to the first processor 100, inputs the second learning image 610 to the second processor 300, and executes learning (S14). When the processing is not the learning processing (N in S10), the processing device 1000 inputs the target image 700 to the first processor 100 and the second processor 300 (S16). The enlarger 400 enlarges the first feature map (S18). The combiner 500 executes a combination of the first feature map 706 and the second feature map 716 (S20).

According to the present embodiment, at the time of learning, since the first learning image 600 is input to the first processor 100 and the second learning image 610 is input to the second processor 300, a wide-area recognition target network and a narrow-area recognition target network can coexist. In addition, since the wide-area recognition target network and the narrow-area recognition target network coexist, it is possible to realize both specifying the positional relation of the elements in the target image and improving the accuracy of the image recognition in the region. In addition, since both specifying the positional relation of the elements in the target image and improving the accuracy of the image recognition in the region are realized, the accuracy of the image recognition in the neural network not including the fully connected layer can be improved. In addition, since the size of the first feature map is changed by the enlarger 400, the conversion magnification in the first processor 100 and the conversion magnification in the second processor 300 can be set independently. In addition, since the conversion magnification in the first processor 100 and the conversion magnification in the second processor 300 are set independently, processing suitable for each of the first processor 100 and the second processor 300 can be executed. In addition, since processing suitable for each of the first processor 100 and the second processor 300 is executed, the recognition accuracy can be improved.

In addition, since the second learning image 610 is the center portion of the first learning image 600, a narrow-area authentication target can be disposed in a part of a wide-area authentication target. In addition, since the first feature map is enlarged by n times by duplicating the values of the pixels included in the first feature map to the pixels to be added, the enlargement can be easily executed. In addition, the third pixel is added between the first pixel and the second pixel adjacent to each other in the first feature map, and the values obtained by interpolating the value of the first pixel and the value of the second pixel are used for the third pixel, so that the first feature map is enlarged by n times. Therefore, it is possible to enlarge the first feature map while maintaining the quality of the first feature map. In addition, since the two inputs are combined as different channels, the combination can be easily executed. In addition, since the two inputs are combined by performing four arithmetic operations for each pixel, the combination can be easily executed.

An outline of one aspect of the present disclosure is as follows. In order to solve the above problem, a processing device (1000) according to one aspect of the present disclosure includes: a first processor (100) that executes processing of a first neural network on a target image (700) to be processed and generates a first feature map having a size $(1/m) \times (1/n)$ times as large as the target image (700); an enlarger (400) that enlarges the first feature map generated in the first processor (100) by n times; a second processor (300) that executes processing of a second neural network on the target image (700) and generates a second feature map (716) having a size $(1/m)$ times as large as the target image (700); and a combiner (500) that combines the first feature map enlarged by n times in the enlarger (400) and the second feature map (716) generated in the second processor (300). The first neural network of the first processor (100) and the second neural network of the second processor (300) do not include a fully connected layer. At the time of learning, a first learning image (600) is input to the first neural network of the first processor (100). At the time of learning, a second learning image (610) that is a part of the first learning image (600) and has a size $(1/n)$ times as large as the first learning image (600) is input to the second neural network of the second processor (300). At the time of learning, the combiner (500) is connected to the first processor (100) without passing through the enlarger (400) and is connected to the second processor (300).

The second learning image (610) may be a center portion of the first learning image (600).

The enlarger (400) may enlarge the first feature map by n times by duplicating a value of a pixel included in the first feature map to a pixel to be added.

The enlarger (400) may add a third pixel between a first pixel and a second pixel adjacent to each other in the first feature map, and enlarge the first feature map by n times by using values obtained by interpolating a value of the first pixel and a value of the second pixel for the third pixel.

The combiner (500) may combine two inputs as different channels.

The combiner (500) combines two inputs by performing four arithmetic operations for each pixel.

Another aspect of the present disclosure is a processing method. This method includes: a step of executing processing of a first neural network on a target image (700) to be processed and generating a first feature map having a size $(1/m) \times (1/n)$ times as large as the target image (700); a step of enlarging the generated first feature map by n times; a step of executing processing of a second neural network on the target image (700) and generating a second feature map (716) having a size $(1/m)$ times as large as the target image (700); and a step of combining the first feature map enlarged by n times and the generated second feature map (716). The first neural network and the second neural network do not include a fully connected layer. At the time of learning, a first learning image (600) is input to the first neural network. At the time of learning, a second learning image (610) that is a part of the first learning image (600) and has a size $(1/n)$ times as large as the first learning image (600) is input to the second neural network. At the time of learning, the combination is performed without the enlargement by n times.

The present disclosure has been described on the basis of the embodiments. The embodiments are merely examples, and it is understood by those skilled in the art that various modifications can be made in the combination of the respective components or the respective processes, and that the modifications are also within the scope of the present disclosure.

The processing device 1000 in the present embodiment connects the average pooling layer 124 of the first processor 100 and the average pooling layer 324 of the second processor 300 to the combiner 500. However, the present disclosure is not limited thereto, and for example, other configurations of the first processor 100 and the second processor 300 may be connected to the combiner 500. For example, the max pooling layer 118 of the first processor 100 and the max pooling layer 318 of the second processor 300 may be connected to the combiner 500. At that time, the max pooling layer 118 is connected to the combiner 500 via the enlarger 400. According to the present modification, a degree of freedom of the configuration can be improved.

INDUSTRIAL APPLICABILITY

According to the present disclosure, the accuracy of image recognition in a neural network that does not include a fully connected layer can be improved.

REFERENCE SIGNS LIST

10 processing device, 20 convolution layer, 22 batch normalization layer, 24, 26 dense block, 28 max pooling layer, 30, 32 dense block, 34 average pooling layer, 62 convolution layer, 64 combination layer, 68 convolution layer, 72 batch normalization layer, 100 first processor, 110 batch normalization layer, 112 convolution layer, 114 dense block, 118 max pooling layer, 120, 122 dense block, 124 average pooling layer, 200 extractor, 300 second processor, 310 batch normalization layer, 312 convolution layer, 314, 316 dense block, 318 max pooling layer, 320, 322 dense block, 324 average pooling layer, 400 enlarger, 500 combiner, 510 convolution layer, 1000 processing device

The invention claimed is:

1. A processing device comprising:
a first processor that executes processing of a first neural network on a target image to be processed and generate a first feature map having a size (1/m)×(1/n) times as large as the target image;
an enlarger that enlarges the first feature map generated in the first processor by n times;
a second processor that executes processing of a second neural network on the target image and generate a second feature map having a size (1/m) times as large as the target image; and
a combiner that combines the first feature map enlarged by n times in the enlarger and the second feature map generated in the second processor, wherein
the first neural network of the first processor and the second neural network of the second processor do not include a fully connected layer,
at the time of learning, a first learning image is input to the first neural network of the first processor, at the time of learning, a second learning image that is a part of the first learning image and has a size (1/n) times as large as the first learning image is input to the second neural network of the second processor, and
at the time of learning, the combiner is connected to the first processor without passing through the enlarger and is connected to the second processor.

2. The processing device according to claim 1, wherein the second learning image is a center portion of the first learning image.

3. The processing device according to claim 1, wherein the enlarger enlarges the first feature map by n times by duplicating a value of a pixel included in the first feature map to a pixel to be added.

4. The processing device according to claim 1, wherein the enlarger adds a third pixel between a first pixel and a second pixel adjacent to each other in the first feature map, and enlarges the first feature map by n times by using values obtained by interpolating a value of the first pixel and a value of the second pixel for the third pixel.

5. The processing device according to claim 1, wherein the combiner combines two inputs as different channels.

6. The processing device according to claim 1, wherein the combiner combines two inputs by performing four arithmetic operations for each pixel.

7. A processing method comprising:
a step of executing processing of a first neural network on a target image to be processed and generating a first feature map having a size (1/m)×(1/n) times as large as the target image;
a step of enlarging the generated first feature map by n times;
a step of executing processing of a second neural network on the target image and generating a second feature map having a size (1/m) times as large as the target image; and
a step of combining the first feature map enlarged by n times and the generated second feature map, wherein
the first neural network and the second neural network do not include a fully connected layer,
at the time of learning, a first learning image is input to the first neural network,
at the time of learning, a second learning image that is a part of the first learning image and has a size (1/n) times as large as the first learning image is input to the second neural network, and
at the time of learning, the combination is performed without the enlargement by n times.

* * * * *